(12) United States Patent
Hadinger

(10) Patent No.: US 6,512,921 B1
(45) Date of Patent: Jan. 28, 2003

(54) SATELLITE MULTIMEDIA DELIVERY TO VEHICLES

(75) Inventor: Peter J. Hadinger, Oakton, VA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/562,504

(22) Filed: May 1, 2000

(51) Int. Cl.[7] .............................. H04Q 7/20
(52) U.S. Cl. .................. 455/431; 455/427; 455/445; 455/428; 455/12.1; 455/13.1; 455/13.2; 455/13.3; 725/76
(58) Field of Search .............................. 455/431, 427, 455/445, 428, 12.1, 13.1, 13.2, 13.3; 725/76

(56) References Cited

U.S. PATENT DOCUMENTS 6,018,659 A * 1/2000 Ayyagari et al. ............. 342/450
6,061,562 A * 5/2000 Martin et al. ................ 455/427
6,392,692 B1 * 5/2002 Monroe ....................... 340/506

* cited by examiner

Primary Examiner—William Trost
Assistant Examiner—Danh Le
(74) Attorney, Agent, or Firm—McAndrews, Held & Malloy, Ltd.

(57) ABSTRACT

A GSO satellite constellation (10) and an NGSO constellation (20) may be used to send various types of communication signals and multimedia signals to an aircraft (30). The video signals are demodulated by a demodulator (46) and routed by a router (64) to TV monitors (72 and 74), as well as short-term video storage (78). Data can be received and transmitted by a low gain, narrowband transmitter/receiver (100) in order to provide voice, computer and control communications at all times during the flight of aircraft (30).

29 Claims, 3 Drawing Sheets

SATELLITE MULTIMEDIA DELIVERY TO VEHICLES

BACKGROUND OF THE INVENTION

This invention relates to satellite communications and more specifically relates to communications between satellites and vehicles.

Airline travelers and crew are one example of a high-value market for multimedia information. Typically, the choices for voice and data networking and entertainment are limited. The current approaches to delivering data to aircraft are limited in bandwidth, global coverage or both. This invention addresses these problems and provides one solution.

BRIEF SUMMARY OF THE INVENTION

The preferred embodiment is useful in a satellite communication system including at least one geostationary satellite and at least one non-geostationary satellite. In such an environment, the preferred embodiment can provide communications between the satellites and a vehicle, such as an aircraft, by having the vehicle receive first carrier signals carrying first data from the geostationary satellite. The first data is received by an antenna located on the vehicle. The first carrier signals are demodulated on the vehicle to generate first data signals, preferably by a first demodulator. Second carrier signals carrying second data from the non-geostationary satellite are received by the vehicle by a second antenna. The second carrier signals are demodulated to generate second data signals on the vehicle, preferably by a second demodulator. The vehicle includes a source of third data signals embodying third data. Third carrier signals carrying the third data for transmission from the vehicle are generated by a modulator in response to the third data signals. The first data is utilized at the vehicle by a first utilization system. The second data also is utilized at the vehicle by a second utilization system. The first data signals are routed to the first utilization system; the second data signals are routed to the second utilization system and the third data signals are routed to the modulator. Preferably, the routing is done by a signal router.

By using the foregoing techniques, various types of data may be transmitted from and received by a vehicle in cooperation with satellites with a degree of accuracy and economy unavailable in the prior art.

DETAILED DESCRIPTION OF THE PREFERRED EMBODIMENTS

Figure 1:
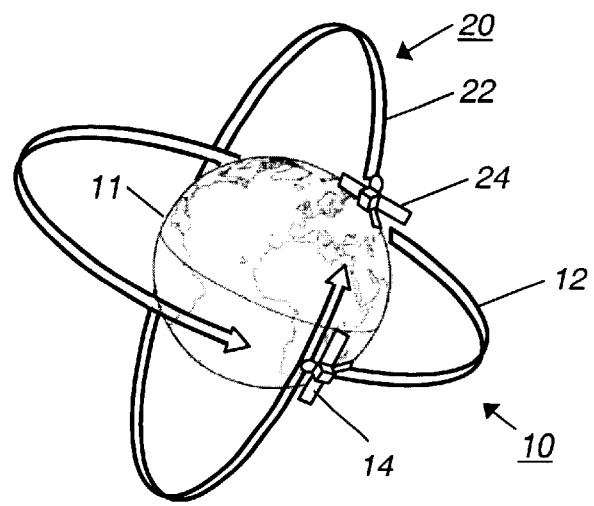
FIG. 1 is a fragmentary schematic view of a preferred form of a geostationary constellation of satellites and a preferred form of a nongeostationary constellation of satellites circling the earth.
Figure 2:
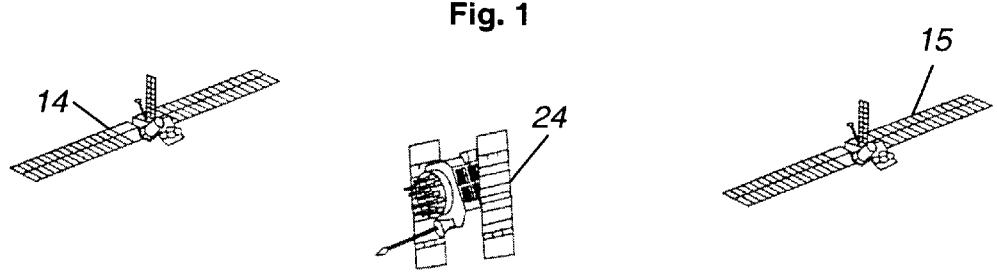
FIG. 2 is a schematic fragmentary view of some of the satellites in the constellation shown in FIG. 1, together with an exemplary aircraft.
Figure 2:

Referring to FIG. 1, a preferred form of the invention comprises a geostationary orbiting (GSO) satellite constellation 10 orbiting the earth 11 in an orbit 12 and including at least one GSO satellite 14 (FIG. 2).

Still referring to FIG. 1, the preferred embodiment also includes a non-geostationary orbiting (NGSO) satellite constellation 20 utilizing an orbit 22 around earth 11 and including an NGSO satellite 24. Additional NGSO satellites are provided to enable communication with a large sector of the earth, and may comprise mobile communication satellites.

The preferred embodiment may be used in connection with a conventional vehicle, such as a conventional commercial passenger aircraft 30.

Figure 3:
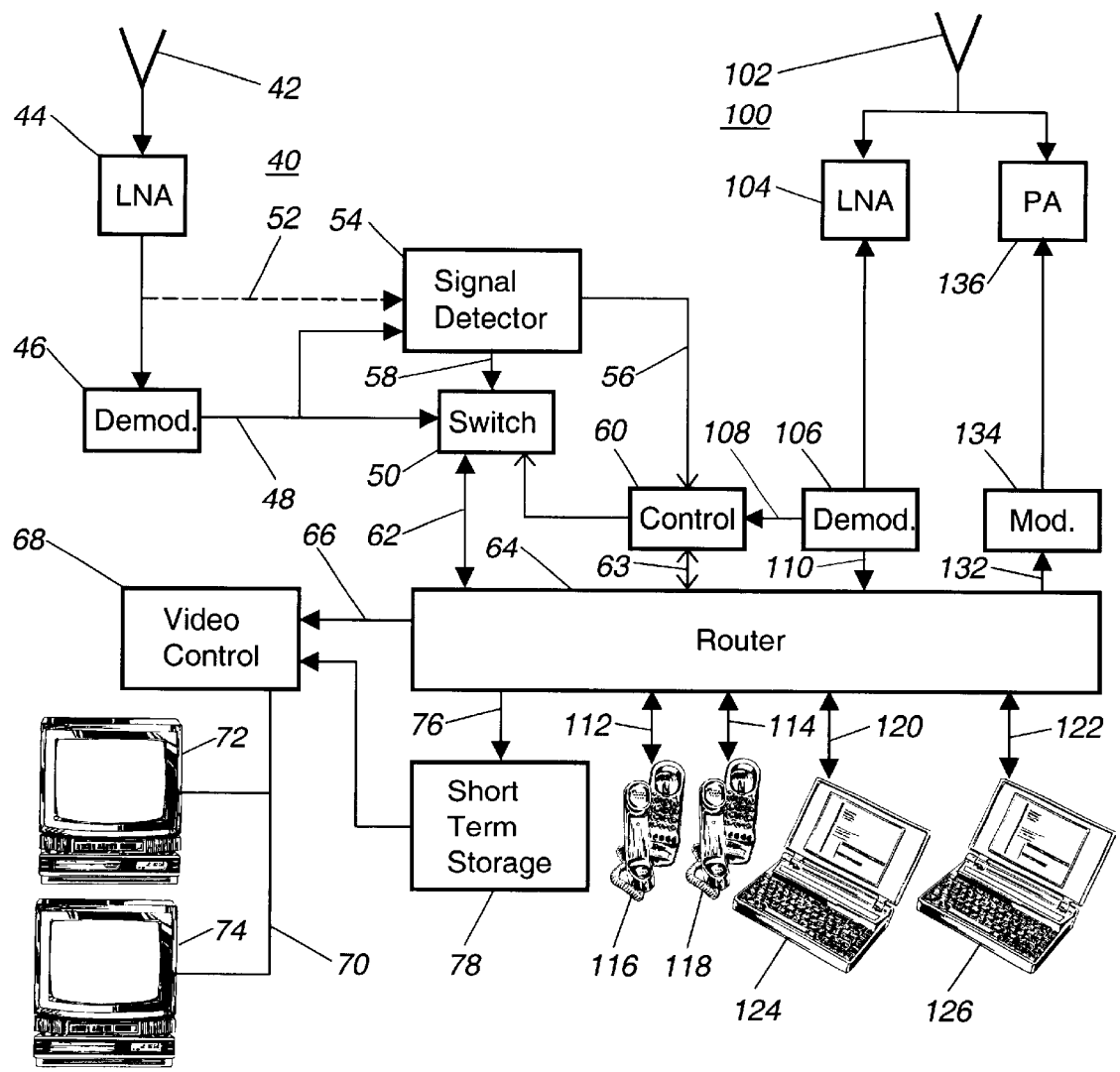
FIG. 3 is a schematic block diagram of a preferred form of apparatus located on the aircraft shown in FIG. 2.

Referring to FIG. 3, the apparatus located on board aircraft 30 includes a high gain, broadband receiver circuit 40 comprising an antenna 42, a low noise amplifier (LNA) 44 and a demodulator 46 connected as shown. Broadband, radio carrier signals which may include multiple channel signals such as FDMA, time-division multiple access (TDMA), and code-division multiple access (CDMA) are received by antenna 42 from the GSO satellites. The output of demodulator 46 is transmitted over a conductor 48 to a remotely controllable switch 50.

A signal detector 54 may receive the demodulated signal over conductor 48, or, alternatively, may receive the carrier signal over a conductor 52. Signal detector 54 determines whether a signal of predetermined amplitude is present on conductors 48 signal or 52. In the event of a signal of sufficient amplitude, signal detector 54 supplies a signal on a conductor 58 which causes switch 52 to switch the demodulated data signals from conductor 48 to a conductor 62. In the event that the signals on conductors 48 or 52 fall below the predetermined threshold, signal detector 54 sends a signal over conductor 58 which causes switch 50 to open the path between conductor 48 and conductor 62.

A signal similar to that supplied on conductor 58 also is supplied over a conductor 56 to a control module 60. Control module 60 may analyze the signal and open or close switch 50 depending on the characteristics of the signal.

The radio carrier signals received by receiver 40 may include video signals and high speed data signals. The video signals are transmitted over conductor 62 to a router 64 which transmits the video signals over another conductor 66 to a conventional video control 68. The video signals also are transmitted over a conductor 76 to a short-term storage unit 78 which is well known to those skilled in the art.

Video control 68 supplies the video data signals over a network 70 to individual video monitors 72 and 74 located in different places in vehicle 30. By using the foregoing techniques, both live and stored video presentations can be made available to the passengers in vehicle 30.

Still referring to FIG. 3, vehicle 30 also includes a low gain, narrowband, transmitter/receiver 100 comprising an antenna 102, a low noise amplifier 104 and a demodulator 106 connected as shown. Antenna 102 receives narrowband carrier signals that may include multi-channel signals such as FDMA, TDMA, and CDMA from narrowband NGSO satellites, such as satellite 24 (FIG. 2). The demodulated data signals are transmitted over a conductor 108 to control module 60 and over a conductor 110 to router 64.

The data signals on bus 110 may comprise mobile telephone data which is routed by router 64 over a bus 112 to a telephone hand set 116 and over a bus 114 to a second telephone hand set 118. Telephone hand sets may be located at different locations within vehicle 30.

The data on bus 110 also may comprise computer data, such as the packets transmitted in TCP/IP protocol on the internet, which is routed by router 64 over a bus 120 to a is fixed or portable computer 124 and over another bus 122 to another fixed or portable computer 126. The computers may be utilized by the passengers in different locations on vehicle 30.

Telephone conversations may be held on vehicle 30 by utilizing handsets 116 and 118. The passengers aboard aircraft 30 speak into the handsets thereby generating voice data which is routed by router 64 over a bus 132 to a modulator 134 which generates radio carrier signals carrying the data in a manner suitable for reception by the narrowband satellites. The carrier signals are amplified by a conventional power amplifier 136 (PA) and then transmitted from antenna 102 to one of the narrowband satellites illustrated in FIGS. 1 and 2.

Computer data may be sent from vehicle 30 by utilizing computers 124 and 126. For example, a message may be typed into computer 124 and the resulting computer data may be transmitted over bus 122 and routed by router 64 through bus 132 to modulator 134. The modulator may place the signals in TCP/IP protocol and then generate carrier signals carrying the data in a manner suitable for reception by the narrowband satellites. The modulated carrier signals are amplified and then transmitted by antenna 102 to one of the narrowband satellites shown in FIGS. 1 and 2.

Credit card transactions also can be carried out by the passengers aboard vehicle 30. For example, a credit card reader associated with handsets 116 and 118 may enter data which is transmitted from vehicle 30 to one of the narrowband satellites. The signal is relayed to the earth and the credit card number is verified. A reply indicating whether the credit card number has been accepted or rejected is sent by a return signal through antenna 102 and demodulator 106 to control 60 which transmits a programming signal over bus 63 to router 64. In response to the signal from bus 63, router 64 either permits or prevents phone messages from being utilized by the headset for which the credit card number was submitted. A similar operating mode can permit or prevent signals from being received by one of computers 124 and 126 based upon credit card number acceptance.

Router 64 may be programmed to interchange data on the various busses and conductors illustrated in FIG. 3. The programming may be received from antenna 102 and transmitted through demodulator 106 and bus 108 to control module 60. Module 60 programs router 64 in a well known manner.

Figure 4:
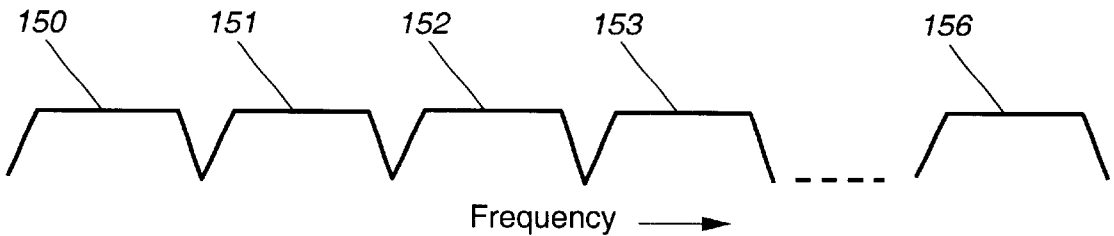
FIG. 4 is a schematic illustration of a preferred form of frequency distribution for the channels of data transmitted by one of the geostationary satellites shown in FIGS. 1 and 2 where frequency division multiple access (FDMA) is employed.

FIG. 4 illustrates a preferred form of frequency distribution of various data channels transmitted by GSO satellites, such as satellites 14 and 15. For example, the radio carrier signals transmitted by such satellites may include video channels 150–153, as well as a high speed data channel 156.

Figure 5:
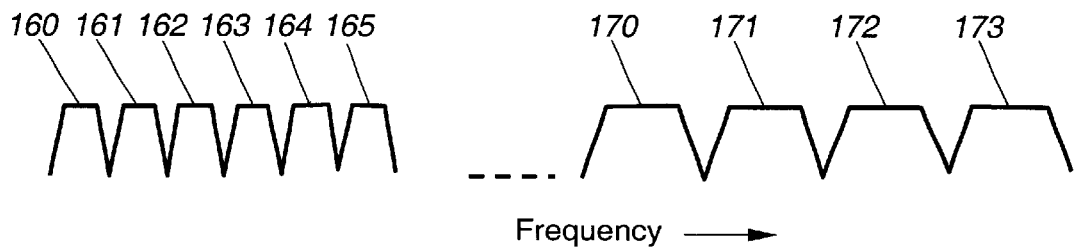
FIG. 5 is a schematic illustration of a preferred form of frequency distribution of various data channels transmitted by one of the non-geostationary satellites shown in FIGS. 1 and 2 where FDMA is employed.

FIG. 5 illustrates a preferred form of frequency distribution for the narrowband satellites. For example, such satellites may transmit radio carrier signals divided into voice channels 160–165 and also including data channels 170–173.

With respect to the various channels shown in FIGS. 4 and 5, each may be transmitted by frequency division multiple access coding. Alternatively, code division multiple access or time division multiple access also may be used.

Figure 6:
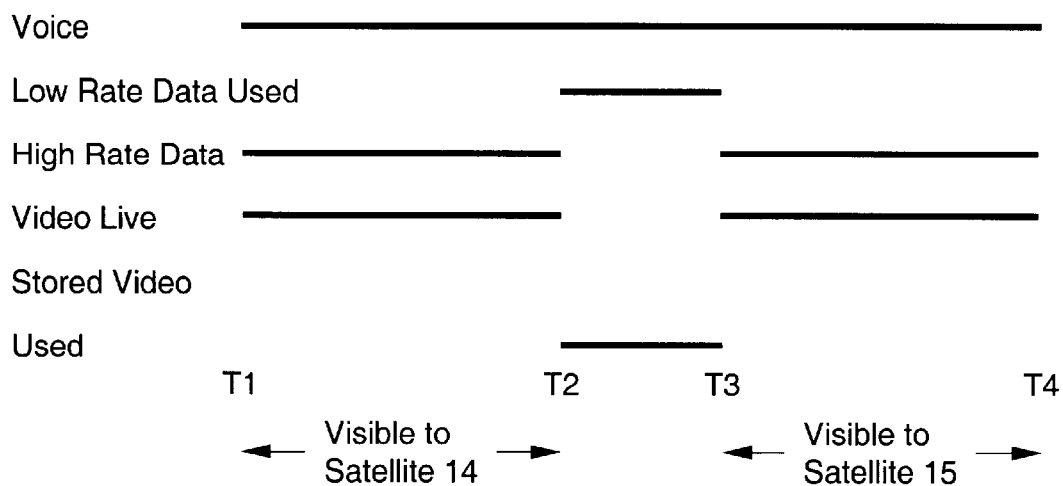
FIG. 6 is a time sequence diagram showing the types of data utilized by the aircraft shown in FIG. 2 during various portions of its flight.

FIG. 6 illustrates typical time periods during which various kinds of data are available for transmission from the satellites to vehicle 30 and vice versa. During time T1–T2, high speed data may be received from GSO satellite 14, and during time period T3–T4, high speed data also may be received from GSO satellite 15. During time period T2–T3, data cannot be received from either satellite 14 or satellite 15. However, data may be received from NGSO satellites throughout the flight from time period T1–T4. As a result, voice data, such as mobile telephone data, may be received as indicated in the top line in FIG. 6 from time T1–T4. Since high speed data may be received from the GSO satellites except during time period T2–T3, low rate data from the narrowband satellites is only used during that time period as indicated in the second line of FIG. 6. As shown in the third line in FIG. 6, high rate data is received by vehicle 30 during time periods T1–T2 and T3–T4. As shown in the fourth line of FIG. 6, live video is signals may be received from GSO satellite 14 during time period T1–T2 and from GSO satellite 15 during time period T3–T4. During time periods T1–T2 and T3–T4, video signals are stored in short term storage 78 as previously described. During time period T2–T3, when live video is not available from either satellite 14 or 15, video control 68 (FIG. 3) may provide video signals from short term storage 78 to TV monitors 72 and 74.

Those skilled in the art will recognize that the preceding was a description of the preferred embodiments which may be altered and modified without departing from the true spirit and scope of the invention as defined in the accompanying claims.

What is claimed is:

1. In a satellite communication system comprising at least one geostationary broadband satellite and at least one narrowband satellite, communication apparatus suitable for location on a vehicle for providing communications between said satellites and said vehicle comprising in combination:

a first antenna configured to receive first carrier signals carrying first data from said broadband geostationary satellite;

a first demodulator connected to said first antenna and configured to demodulate said first carrier signals to generate first data signals;

a second antenna configured to receive second carrier signals carrying second data from said narrowband satellite;

a second demodulator connected to said second antenna and configured to demodulate said second carrier signals to generate second data signals;

a source of third data signals embodying third data;

a modulator responsive to said third data signals for generating third carrier signals carrying said third data for transmission by said second antenna;

a first utilization system configured to utilize said first data;

a second utilization system configured to utilize said second data; and a router connected to route said first data signals to said first utilization system, to route said second data signals to said second utilization system and to route said third data signals to said modulator.

2. Apparatus, as claimed in claim 1, wherein said first antenna comprises a broadband antenna.

3. Apparatus, as claimed in claim 1, wherein said first carrier signals comprise frequency division multiple access signals.

4. Apparatus, as claimed in claim 1, wherein said first carrier signals comprise video channels and data channels.

5. Apparatus, as claimed in claim 1, wherein said first data comprises video data.

6. Apparatus, as claimed in claim 1, wherein said second antenna comprises a narrowband antenna.

7. Apparatus, as claimed in claim 1, wherein said second carrier signals comprise frequency division multiple access signals.

8. Apparatus, as claimed in claim 1, wherein said second carrier signals comprise voice channels and data channels.

9. Apparatus, as claimed in claim 1, wherein said second data comprises mobile telephone data.

10. Apparatus, as claimed in claim 1, wherein said second data comprises packets of data.

11. Apparatus, as claimed in claim 1, wherein said source of third data comprises a telephone.

12. Apparatus, as claimed in claim 1, wherein said source of third data comprises a computer.

13. Apparatus, as claimed in claim 1, wherein said first utilization system comprises a television monitor.

14. Apparatus, as claimed in claim 1, wherein said second utilization system comprises a telephone.

15. Apparatus, as claimed in claim 1, wherein said second utilization system comprises a network capable of transmitting computer data.

16. Apparatus, as claimed in claim 1, wherein said vehicle comprises an aircraft.

17. Apparatus, as claimed in claim 1, and further comprising a switch arranged to couple said first demodulator to said router.

18. Apparatus, as claimed in claim 1, and further comprising a signal detector responsive to one of said first carrier signals and said first data signals greater than a predetermined signal level for causing said switch to couple said first data signals to said router.

19. Apparatus, as claimed in claim 1, wherein said signal detector is responsive to one of said first carrier signals and said first data signals less than a predetermined signal level for preventing said switch from coupling said first data signals to said router.

20. Apparatus, as claimed in claim 1, wherein said second data comprises second control data and second communication data, wherein said second utilization system comprises a first utilization station at a first location in said vehicle and a second utilization station at a second location in said vehicle and wherein said apparatus further comprises a control module responsive to said control data to program said router to selectively disable communication of said second communication data to at least one of said first and second utilization stations.

21. Apparatus, as claimed in claim 1, and further comprising a storage unit connected to store at least a portion of said first data signals to enable usage of said stored first data signals by said first utilization system in the event said first carrier signals become unusable.

22. In a satellite communication system comprising at least one geostationary satellite and at least one non-geostationary satellite, a method of providing communications between said satellites and a vehicle comprising in combination:

receiving at said vehicle first carrier signals carrying first data from said geostationary satellite;

demodulating said first carrier signals to generate first data signals;

receiving at said vehicle second carrier signals carrying second data from said non-geostationary satellite;

demodulating said second carrier signals to generate second data signals;

generating at said vehicle third data signals embodying third data;

modulating said third data signals to generate third carrier signals carrying said third data for transmission from said vehicle;

utilizing said first data at a first site in said vehicle;

utilizing said second data at a second site in said vehicle;

routing said first data signals to said first site;

routing said second data signals to said second site; and routing said third data signals to enable said modulating.

23. A method, as claimed in claim 22, wherein said utilizing said first data comprises generating a television image.

24. A method, as claimed in claim 22, wherein said utilizing said second data comprises generating a telephone signal.

25. A method, as claimed in claim 22, wherein said utilizing said second data comprises storing said second data in a computer.

26. A method, as claimed in claim 22, and further comprising detecting one of said first carrier signals or said first data signals greater than a predetermined signal level and enabling the transmission of said first data signals in response to said detecting.

27. A method, as claimed in claim 26, and further comprising detecting one of said first carrier signals and said first data signals less than a predetermined signal level and preventing the transmission of said first data signals in response to said detecting.

28. A method, as claimed in claim 22, wherein said second data comprises second control data and second communication data, wherein said utilizing said first data comprises utilizing at a first location in said vehicle and utilizing at a second location in said vehicle and wherein said method further comprises selectively disabling communication of said second communication data in response to said second control data.

29. A method, as claimed in claim 22, and further comprising storing at least a portion of said first data signals to enable usage of said stored first data signals in the event said first carrier signals become unusable.

* * * * *

(12) EX PARTE REEXAMINATION CERTIFICATE (8479th)
United States Patent
Hadinger

(10) Number: US 6,512,921 C1
(45) Certificate Issued: Aug. 23, 2011

(54) SATELLITE MULTIMEDIA DELIVERY TO VEHICLES

(75) Inventor: Peter J. Hadinger, Oakton, VA (US)

(73) Assignee: Northrop Grumman Systems Corporation, Los Angeles, CA (US)

Reexamination Request:
No. 90/010,871, Apr. 6, 2010

Reexamination Certificate for:
Patent No.: 6,512,921
Issued: Jan. 28, 2003
Appl. No.: 09/562,504
Filed: May 1, 2000

(51) Int. Cl.
*H04B 7/185* (2006.01)

(52) U.S. Cl. ............ 455/431; 455/12.1; 455/13.1; 455/13.2; 455/13.3; 455/427; 455/428; 455/445; 725/76

(58) Field of Classification Search .................. None
See application file for complete search history.

(56) References Cited

U.S. PATENT DOCUMENTS

| | | |
|---|---|---|
| 5,404,567 A | 4/1995 | DePietro et al. |
| 5,678,171 A | 10/1997 | Toyama et al. |
| 5,717,878 A | 2/1998 | Sannino |
| 5,760,819 A | 6/1998 | Sklar et al. |
| 5,790,175 A | 8/1998 | Sklar et al. |
| 5,801,751 A | 9/1998 | Sklar et al. |
| 5,973,722 A | 10/1999 | Wakai et al. |
| 5,990,928 A | 11/1999 | Sklar et al. |
| 6,018,659 A | 1/2000 | Ayyagari et al. |
| 6,023,616 A | 2/2000 | Briskman |
| 6,032,041 A | 2/2000 | Wainfan et al. |
| 6,061,562 A | 5/2000 | Martin et al. |
| 6,151,354 A | 11/2000 | Abbey |
| 6,201,797 B1 | 3/2001 | Leuca et al. |
| 6,392,692 B1 | 5/2002 | Monroe |
| 6,400,926 B1 | 6/2002 | Dent |
| 6,473,466 B1 | 10/2002 | Miyashita et al. |
| 6,507,952 B1 | 1/2003 | Miller et al. |
| 6,529,706 B1 | 3/2003 | Mitchell |
| 6,574,338 B1 | 6/2003 | Sachdev |
| 6,741,841 B1 | 5/2004 | Mitchell |
| 6,748,597 B1 | 6/2004 | Frisco et al. |
| 6,751,801 B1 | 6/2004 | Frisco et al. |
| 6,801,768 B2 | 10/2004 | Gleyzes et al. |
| 7,155,160 B2 | 12/2006 | Ichiyoshi |
| 7,546,123 B2 | 6/2009 | Wright et al. |
| 7,599,691 B1 | 10/2009 | Mitchell |
| 2005/0282493 A1 | 12/2005 | Chuprun et al. |

FOREIGN PATENT DOCUMENTS

| | | |
|---|---|---|
| EP | 0 570 198 A2 | 5/1993 |
| EP | 0 837 567 A2 | 10/1997 |

*Primary Examiner* — Scott L. Weaver

(57) ABSTRACT

A GSO satellite constellation (10) and an NGSO constellation (20) may be used to send various types of communication signals and multimedia signals to an aircraft (30). The video signals are demodulated by a demodulator (46) and routed by a router (64) to TV monitors (72 and 74), as well as short-term video storage (78). Data can be received and transmitted by a low gain, narrowband transmitter/receiver (100) in order to provide voice, computer and control communications at all times during the flight of aircraft (30).

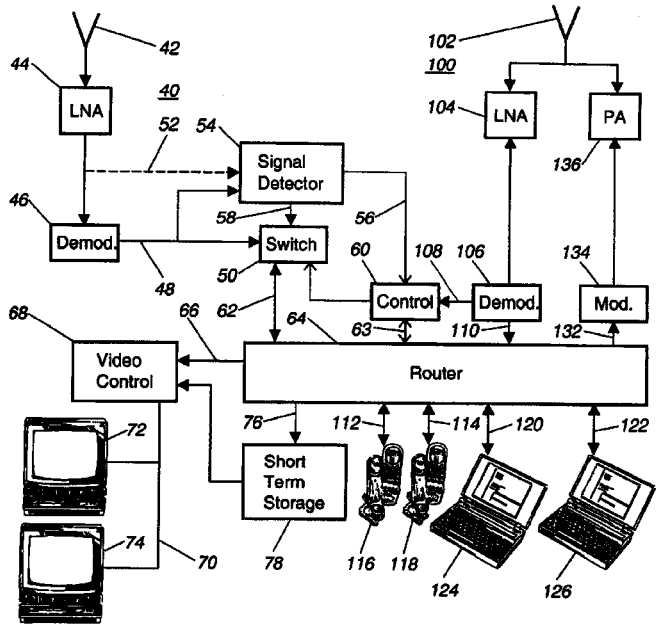

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 18-20, 22 and 28 are determined to be patentable as amended.

Claims 2-17, 21, 23-27 and 29, dependent on an amended claim, are determined to be patentable.

1. In a satellite communication system comprising at least one geostationary broadband satellite and at least one narrowband satellite, communication apparatus suitable for location on a vehicle for providing communications between said satellites and said vehicle comprising in combination:
   a first antenna configured to receive first carrier signals carrying first data from said broadband geostationary satellite;
   a first demodulator connected to said first antenna and configured to demodulate said first carrier signals to generate first data signals;
   a second antenna configured to receive second carrier signals carrying second data from said narrowband satellite;
   a second demodulator connected to said second antenna and configured to demodulate said second carrier signals to generate second data signals;
   a source of third data signals embodying third data;
   a modulator responsive to said third data signals for generating third carrier signals carrying said third data for transmission by said second antenna;
   a first utilization system configured to utilize said first data;
   a second utilization system configured to utilize second data; [and]
   a router connected to route said first data signals to said first utilization system, to route said second data signals to said second utilization system and to route said third data signals to said modulator; *and*
   *a control module responsive to the second data signals from the second demodulator, said control module providing control signals to the router that selectively prevent or permit the second data to be utilized by the second utilization system.*

18. Apparatus, as claimed in claim [1] *17*, and further comprising a signal detector responsive to one of said first carrier signals [and] *or* said first data signals [greater than a predetermined signal level for causing said switch to couple said first data signals to said router], *said signal detector determining whether the intensity of the first carrier signals or the first data signals is greater than a predetermined signal level, and if so, causing said switch to send said first data signals to said router.*

19. Apparatus, as claimed in claim 1, wherein [said signal detector is responsive to one of said first carrier signals and said first data signals less than a predetermined signal level for preventing said switch from coupling said first data signals to said router] *said control module prevents the second data from being utilized by a telephone or a computer in the second utilization system based on whether a credit card has been accepted.*

20. Apparatus, as claimed in claim 1, wherein said second data comprises second control data and second communication data, wherein said second utilization system comprises a first utilization station at a first location in said vehicle and a second utilization station at a second location in said vehicle [and wherein said apparatus further comprises a control module responsive to said control data to program said router to selectively disable communication of said second communication data to at least one of said first and second utilization stations], *said control module using the second control data to program the router.*

22. In a satellite communication system comprising at least one geostationary satellite and at least one non-geostationary satellite, a method of providing communications between said satellites and a vehicle comprising in combination:
   receiving at said vehicle first carrier signals carrying first data from said geostationary satellite;
   demodulating said first carrier signals to generate first data signals *in a first demodulator*;
   receiving at said vehicle second carrier signals carrying second data from said non-geostationary satellite;
   demodulating said second carrier signals to generate second data signals *in a second demodulator*;
   generating at said vehicle third data signals embodying third data;
   modulating said third data signals to generate third carrier signals carrying said third data for transmission from said vehicle;
   utilizing said first data at a first site in said vehicle;
   utilizing said second data at a second site in said vehicle;
   routing said first data signals to said first site *using a router*;
   *providing the second data signals to a control module;*
   *providing control signals to the router from the control module that selectively prevent or permit the second data to be utilized by the second site;*
   routing said second data signals to said second site *by the router if the control signals allow the second data to be utilized by the second site;* and
   routing said third data signals *by the router* to enable said modulating.

28. A method, as claimed in claim 22, wherein said second data comprises second control data and second communication data, wherein said utilizing said first data comprises utilizing at a first location in said vehicle and utilizing at a second location in said vehicle and [wherein said method further comprises selectively disabling communication of said second communication data in response to said second control data] *wherein selectively permitting or preventing the second data to be utilized by the second site includes determining if a credit card has been accepted.*

* * * * *